(12) United States Patent
Okuno et al.

(10) Patent No.: US 10,745,543 B2
(45) Date of Patent: Aug. 18, 2020

(54) ANTISTATIC RUBBER COMPOSITION

(71) Applicant: SUMITOMO RUBBER INDUSTRIES, LTD., Hyogo (JP)

(72) Inventors: Yudai Okuno, Hyogo (JP); Masashi Hamakubo, Hyogo (JP); Akihiro Mine, Hyogo (JP); Toshiyuki Hirai, Hyogo (JP); Yoshihiro Yamada, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 15/990,835

(22) Filed: May 29, 2018

(65) Prior Publication Data

US 2019/0016875 A1    Jan. 17, 2019

(30) Foreign Application Priority Data

Jul. 12, 2017 (JP) ................. 2017-135964

(51) Int. Cl.
| | |
|---|---|
| C08L 9/00 | (2006.01) |
| B41J 13/076 | (2006.01) |
| B65H 5/06 | (2006.01) |
| C08L 23/16 | (2006.01) |
| C08K 3/017 | (2018.01) |

(52) U.S. Cl.
CPC ............... *C08L 9/00* (2013.01); *B41J 13/076* (2013.01); *B65H 5/06* (2013.01); *C08L 23/16* (2013.01); *B65H 2401/111* (2013.01); *B65H 2404/19* (2013.01); *B65H 2515/716* (2013.01); *C08K 3/017* (2018.01); *C08L 2201/04* (2013.01); *C08L 2205/025* (2013.01); *C08L 2205/03* (2013.01)

(58) Field of Classification Search
CPC .. C08L 9/00; C08L 53/00; C08L 23/16; C08L 23/30; B41J 13/02; B41J 13/076; B65H 5/06; B65H 2404/19; B65H 2401/111
See application file for complete search history.

(56) References Cited

U.S. PATENT DOCUMENTS

| | | | | |
|---|---|---|---|---|
| 2004/0135129 A1* | 7/2004 | Hattori | .................... | C08L 23/16 |
| | | | | 252/510 |
| 2007/0116958 A1* | 5/2007 | Suzuki | ................ | C08L 2666/20 |
| | | | | 428/411.1 |
| 2008/0042108 A1* | 2/2008 | Tajima | ..................... | C08L 9/02 |
| | | | | 252/500 |

FOREIGN PATENT DOCUMENTS

JP    2004189884    7/2004

OTHER PUBLICATIONS

Pelestat/Pelectron data sheet (2019) (Year: 2019).*

* cited by examiner

*Primary Examiner* — Robert C Boyle
(74) *Attorney, Agent, or Firm* — JCIPRNET

(57) ABSTRACT

There is provided a rubber composition in which an antistatic agent is uniformly dispersed and the rubber composition has antistatic ability, coefficient of friction, and wear resistance. A rubber composition includes 7 parts by mass or more of a polyether/polyolefin block copolymer resin with respect to 100 parts by mass of a rubber component, and the total amount or a part of a rubber component is mixed with a polyether/polyolefin block copolymer resin at a temperature that is equal to or higher than a melting point of the polyether/polyolefin block copolymer resin.

5 Claims, 1 Drawing Sheet

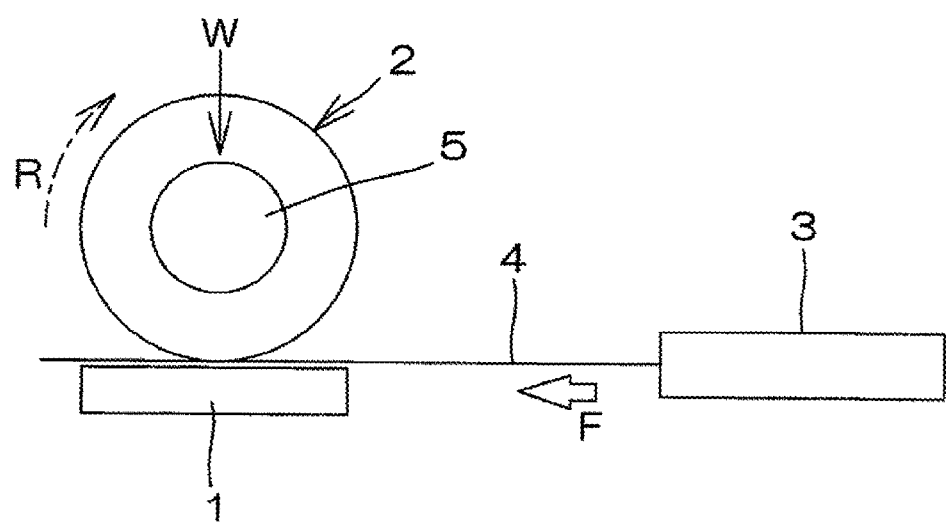

ANTISTATIC RUBBER COMPOSITION

CROSS-REFERENCE TO RELATED APPLICATION

This application claims the priority benefit of Japanese application serial no. 2017-135964, filed on Jul. 12, 2017. The entirety of the above-mentioned patent application is hereby incorporated by reference herein and made a part of this specification.

BACKGROUND

Technical Field

The present disclosure relates to a rubber composition having an excellent antistatic antistatic ability and wear resistance and a paper feed roller obtained by crosslinking the composition.

Description of Related Art

For office automation (OA) devices such as a printer, paper feed rollers are used as paper feed members. Incidentally, in the case of an inkjet printer, fine ink particles called ink mist undergo attraction due to static electricity generated by friction between a paper feed roller and paper, ink mist may adhere to a printing surface of a base component, and thus there is a risk of paper becoming dirty. Thus, the paper feed roller needs to have an antistatic ability in some cases.

As a method of imparting an antistatic ability to a paper feed roller, a method of blending carbon black into a rubber composition for a paper feed roller is known. However, there is then a problem that paper may be blackened when the paper and the paper feed roller rub against each other. In addition, when an antistatic agent with a low molecular weight or the like is blended in, a coefficient of friction between the paper and the paper feed roller decreases and there is then a possibility of a paper feeding failure or double feeding.

Since a polymer type antistatic agent does not cause blooming or bleeding on a surface of a resin or a thermoplastic elastomer, allows excellent durability for the efficacy, and has low dependence on humidity, it is used for many resin products and thermoplastic elastomer products for which an antistatic ability is required (for example, Japanese Laid-Open No. 2004-189884). However, a melting point of a polymer type antistatic agent is generally a high temperature and is higher than a temperature for kneading that is generally performed when a rubber composition is produced. Therefore, when a polymer type antistatic agent is blended into the rubber composition, there may be a problem that the polymer type antistatic agent does not sufficiently disperse into the rubber composition, but remains as clumps, which results in defects in the appearance of the rubber composition or deterioration in physical properties. In addition, when the kneading temperature is set to be high in order to melt the polymer type antistatic agent, problems such as deterioration of the rubber component and other compounding agents due to heat and an extended kneading time may occur.

In addition, in the case of a paper feed roller made of a thermoplastic elastomer, when it is not crosslinked or is weakly crosslinked, there are problems such as there being a lower wear resistance than that of rubber.

The present disclosure provides a rubber composition in which an antistatic agent is uniformly dispersed and which has an excellent antistatic ability, coefficient of friction and wear resistance.

The inventors conducted extensive studies and as a result, found that, when a polyether/polyolefin block copolymer resin is used as an antistatic agent and is mixed into a rubber component at a temperature equal to or higher than a melting point of the polyether/polyolefin block copolymer resin, a rubber composition in which the antistatic agent is uniformly dispersed and which has an excellent antistatic ability, coefficient of friction and wear resistance is obtained, thereby completing the present disclosure.

SUMMARY

The present disclosure provides a rubber composition. The rubber composition includes 7 parts by mass or more of a polyether/polyolefin block copolymer resin with respect to 100 parts by mass of a rubber component, and the total amount or a part of a rubber component is mixed with a polyether/polyolefin block copolymer resin at a temperature that is equal to or higher than a melting point of the polyether/polyolefin block copolymer resin.

BRIEF DESCRIPTION OF THE DRAWINGS

FIG. 1 is a schematic diagram of a measurement test for a coefficient of friction of a paper feed roller.

DESCRIPTION OF THE EMBODIMENTS

<Antistatic Agent>

In the present disclosure, a polyether/polyolefin block copolymer resin which is a polymer type antistatic agent is used as an antistatic agent. In the polyether/polyolefin block copolymer resin, a polyether block functions as a hydrophilic segment and a polyolefin block functions as a lipophilic segment. That is, the hydrophilic segment has a function of decreasing surface resistance of a molded article due to its hygroscopicity and the lipophilic segment has a function of improving compatibility with a rubber component which is a base component.

A content of the polyether/polyolefin block copolymer resin is preferably 7 parts by mass or more, more preferably 10 parts by mass or more, still more preferably 15 parts by mass or more, still more preferably 20 parts by mass or more, and most preferably 25 parts by mass or more; and preferably 50 parts by mass or less, and more preferably 40 parts by mass or less with respect to 100 parts by mass of the rubber component.

A melting point of the polyether/polyolefin block copolymer resin is preferably 200° C. or lower and more preferably 150° C. or lower because it is then possible to prevent a rubber component from deteriorating due to heat when the rubber composition is prepared.

Examples of a monomer of the polyether constituting the polyether/polyolefin block copolymer resin include alkylene oxides such as ethylene oxide, propylene oxide, and butylene oxide. In addition, examples of a monomer of the polyolefin constituting the polyether/polyolefin block copolymer resin include olefins such as ethylene, propylene, butene, pentene, and hexene.

As specific examples of the polyether/polyolefin block copolymer resin, for example, commercial products such as Pelestat (registered trademark) and Pelectron (registered trademark) (commercially available from Sanyo Chemical Industries, Ltd.) can be used.

As the polyether/polyolefin block copolymer resin, any one of the above examples may be used alone or two or more thereof may be used in combination.

<Rubber Component>

As the rubber component used in the present embodiment, ethylene propylene diene rubber (EPDM) is appropriately used. When EPDM is blended in, it is possible to improve ozone resistance, weather resistance, heat-aging resistance, cold resistance, low temperature characteristics, and the like.

As EPDM, various EPDMs in which a double bond is introduced into a main chain by adding a small amount of a third component (diene content) to ethylene and propylene can be used. As such an EPDM, for example, various products are provided according to different types and amounts of the third component. Examples of a representative third component include ethylidene norbornene (ENB), 1,4-hexadiene (1,4-HD), and dicyclopentadiene (DCPD). In addition, as EPDM, any of an oil-extended EPDM of which flexibility is adjusted by adding an extending oil and a non-oil-extended EPDM that is not extended with an extending oil may be used. However, an amount of oil added in the oil-extended EPDM is regarded as an amount of a softening agent added (oil amount).

As the non-oil-extended EPDM, for example, one or two or more selected from among Esprene (registered trademark) 501, Esprene 505A, Esprene 512F, and Esprene 532 (commercially available from Sumitomo Chemical Company, Ltd.) and Mitsui EPT3045 and Mitsui EPT4045 (commercially available from Mitsui Chemicals, Inc.) may be used.

As an ENB type oil-extended EPDM in which a diene is ENB, for example, one or two or more selected from among Esprene 670F [rubber content:extending oil=100:100 (mass ratio)] and Esprene 671F [rubber content:extending oil=100:70 (mass ratio)] (commercially available from Sumitomo Chemical Company, Ltd.); and Mitsui EPT3042E [rubber content:extending oil=100:120 (mass ratio)] (commercially available from Mitsui Chemicals, Inc.) may be used. In addition, as a DCPD type oil-extended EPDM in which a diene is DCPD, for example, Esprene 400 [rubber content: extending oil=100:100 (mass ratio)] (commercially available from Sumitomo Chemical Company, Ltd.) may be used.

As the EPDM, any one of the above examples may be used alone or two or more types thereof may be used in combination.

A proportion of EPDM in the total amount of the rubber component is preferably 96 mass % or more, more preferably 97 mass % or more, still more preferably, 98 mass % or more, and most preferably 99 mass % or more.

As a rubber component used in addition to EPDM in the present embodiment, a crosslinkable rubber component that is generally used in the rubber industry can be used. For example, chloroprene rubber (CR), natural rubber (NR), butadiene rubber (BR), styrene butadiene rubber (SBR), isoprene rubber (IR), acrylonitrile-butadiene rubber (NBR), hydrogenated nitrile rubber (HNBR), butyl rubber (IIR), ethylene propylene rubber, polynorbornene rubber, silicone rubber, chlorinated polyethylene rubber, fluoro rubber (FKM), acrylic rubber (ACM), and a Hydrin rubber may be used. These crosslinkable rubber components may be used alone or two or more thereof may be used in combination.

<Crosslinking Agent>

In the rubber composition prepared in the present embodiment, a crosslinking agent for crosslinking the rubber component can be blended in. As the crosslinking agent, a crosslinking agent of a general sulfur vulcanization type (a type in which sulfur or a sulfur-containing compound, a vulcanization accelerator, and a vulcanization acceleration aid are combined) can be used, but a peroxide crosslinking agent may be appropriately used.

For the peroxide crosslinking agent, it is not necessary to use a combination of a vulcanization accelerator, stearic acid (vulcanization acceleration aid), and the like which cause blooming on a surface of the paper feed roller and decrease a coefficient of friction as in a crosslinking agent of a sulfur vulcanization type, and since a peroxide crosslinking agent itself does not cause blooming, there is no risk of a coefficient of friction decreasing. Therefore, a decrease in a coefficient of friction when the paper feed roller is repeatedly brought into contact with paper and resulting conveyance failures are favorably prevented so that it is possible to obtain a paper feed roller by which paper feeding is favorably maintained for a longer time.

As the peroxide crosslinking agent, for example, one or two or more selected from among benzoyl peroxide, 1,1-bis(tert-butylperoxy)-3,3,5-trimethylcyclohexane, 2,5-dimethyl-2,5-di(benzoylperoxy)hexane, di(tert-butylperoxy)diisopropylbenzene, 1,4-bis [(tert-butyl)peroxyisopropyl] benzene, di(tert-butylperoxy)benzoate, tert-butyl peroxybenzoate, dicumyl peroxide, tert-butyl cumyl peroxide, 2,5-dimethyl-2,5-di(tert-butylperoxy)hexane, di-tert-butyl peroxide, and 2,5-dimethyl-2,5-di(tert-butylperoxy)-3-hexene may be used.

A blending proportion of the peroxide crosslinking agent is not particularly limited, and is preferably 0.8 parts by mass or more, more preferably 1.5 parts by mass or more; preferably 5 parts by mass or less, and more preferably 3.5 parts by mass or less with respect to 100 parts by mass of the rubber component, It is possible to crosslink the rubber component using a combination of sulfur or a sulfur-containing compound, a vulcanization accelerator, and a vulcanization acceleration aid together with the peroxide crosslinking agent or in place of the peroxide crosslinking agent.

As a vulcanizing agent, sulfur is appropriately used. Examples of sulfur include powdered sulfur, precipitated sulfur, colloidal sulfur, insoluble sulfur, and highly dispersible sulfur.

As the vulcanization acceleration aid, for example, zinc oxide can be blended in. A content of zinc oxide is not particularly limited, and is preferably 4 parts by mass or more, more preferably 6 parts by mass or more, still more preferably 7 parts by mass or more; and preferably 12 parts by mass or less, more preferably 10 parts by mass or less, and most preferably 9 parts by mass or less with respect to 100 parts by mass of the rubber component.

An average primary particle size of zinc oxide is not particularly limited, and is preferably 200 nm or less, more preferably 150 urn or less, still more preferably 120 nm or less, and most preferably 90 nm or less.

An average primary particle size of zinc oxide is not particularly limited, and is preferably 20 nm or more, and more preferably 50 nm or more. Here, the average primary particle size of zinc oxide is an average particle size (average primary particle size) converted from a specific surface area measured by a BET (Brunauer-Emmett-Tellern) method using nitrogen adsorption.

In the rubber composition prepared in the present embodiment, in addition to the above components, a compounding agent that is generally used when a rubber composition is produced, for example, a filler such as carbon black, silica, clay, and a talc, a silane coupling agent, stearic acid, an antioxidant, a co-crosslinking agent, a pigment, a processing aid, an oil, and a wax can be appropriately blended in. Among them, as carbon black, carbon blacks with various grades that can function as a reinforcing agent and a coloring agent for rubber can be used. A blending proportion of carbon black is 0.05 parts by mass or more, and particularly preferably 0.1 parts by mass or more, and preferably 3 parts by mass or less, and particularly preferably 1.5 parts by mass or less with respect to 100 parts by mass of the rubber (total amount).

Examples of an oil include a process oil, a plasticizer, and a mixture thereof. Examples of the process oil include a paraffin process oil, a naphthenic process oil, and an aromatic process oil (aromatic oil). As the plasticizer, various plasticizers, for example, dibutyl phthalate (DBP), dioctyl phthalate (DOP), and tricresyl phosphate, may be used.

<Method of Producing Rubber Composition and Applications>

The rubber composition of the present disclosure is produced by a production method including a process of kneading a rubber component and a polyether/polyolefin block copolymer resin at a kneading temperature that is equal to or higher than a melting point of the polyether/polyolefin block copolymer resin. In the rubber composition obtained in this manner, the polyether/polyolefin block copolymer resin, which is an antistatic agent, is favorably dispersed in the rubber composition and does not remain as clumps. Therefore, physical properties of the rubber composition do not deteriorate and an excellent antistatic ability is exhibited.

In the kneading process, a device, for example, a Banbury mixer, a kneader, an open roller, or a twin-screw extruder, can be used.

The twin-screw extruder mainly includes a hopper which is a material supply port, a cylinder which includes two screws and extrudes a material in one direction while kneading the material, a head that is positioned at a tip on a discharge side of the cylinder, a die (mold) for continuously molding a kneaded material into a certain shape, and an adapter that connects the head and the die. While two helical screws rotate in the cylinder, a material supplied from the hopper is compressed and heated, melted, mixed in, and kneaded, and the kneaded material is sent to the head, and extruded and molded through the die. In addition, a heating device using a heat medium or a cast-in electric heater is provided in each part of the twin-screw extruder in order to promote melting of a supplied material.

The kneading temperature in the kneading process is more preferably +10° C. or higher with respect to the melting point of the polyether/polyolefin block copolymer resin. In addition, in order to prevent thermal deterioration of the rubber component, 200° C. or lower is preferable and 150° C. or lower is more preferable. Here, the kneading temperature in this specification is the highest temperature during kneading. For example, when a twin-screw extruder is used as a kneader, the kneading temperature is the highest setting temperature of the twin-screw extruder.

The method of producing a rubber composition in the present embodiment can include a process of molding the obtained kneaded material (molding process) and the like in addition to the kneading process.

The molding process is a process of molding the kneaded material obtained in the kneading process. A molding method, shape, and the like are not particularly limited, and can be appropriately selected according to a material into which the antistatic agent of the present disclosure is blended. For example, a material may be extruded and molded into a string form, cooled in a water tank or the like, and then cut into lengths of about 2 to 5 mm to form pellets.

Since the rubber composition of the present disclosure has an excellent antistatic ability, it can be used for a rubber product for which an antistatic ability is required. Examples of the rubber product include a rubber material of a paper feed roller and a rubber member of an electronic component production device. Particularly, it can be appropriately used as a rubber material for a paper feed roller because there is no concern of the occurrence of blooming or bleeding on the surface of the rubber composition and it can be colored in an arbitrary color by adding a pigment.

EXAMPLES

The present disclosure will be described with reference to examples. However, the present disclosure is not limited to the examples.

Various chemical components used in the examples and comparative examples are as follows.

Non-oil-extended EPDM: Esprene 505A commercially available from Sumitomo Chemical Company, Ltd (non-oil-extended, third component (diene content): ENB)

Oil-extended EPDM: Esprene 670F commercially available from Sumitomo Chemical Company, Ltd (rubber component:extending oil=100:100 (mass ratio))

Antistatic agent: Pelectron HS commercially available from Sanyo Chemical Industries, Ltd. (polyether/polyolefin block copolymer resin, melting point: about 135° C.) Carbon black: Dia-Black H (HAF series) commercially available from Mitsubishi Chemical Corporation Zinc oxide: two types of zinc oxide commercially available from Sakai Chemical Industry Co., Ltd.

Peroxide crosslinking agent: Percumyl D (dicumyl peroxide) commercially available from Nof Corporation Production Example <Preparation of Sample>

According to formulation details shown in Table 1, various chemical components other than the peroxide crosslinking agent were mixed in using a 3 L kneader, and a peroxide crosslinking agent was then mixed in using an open roller to obtain an uncrosslinked rubber composition. In Example 3 and Comparative Examples 1 and 2, during mixing using the 3 L kneader, mixing was performed such that the temperature inside a kneader layer was 140° C. or higher. In Comparative Example 3, mixing was performed such that the temperature inside a kneader layer was 80° C. or lower. Here, the value in parentheses for the oil-extended EPDM indicates an amount of EPDM as the rubber component.

The uncrosslinked rubber composition was pressed and crosslinked in conditions at 170° C. for 20 minutes to obtain a crosslinked rubber sheet with a size of 200×200 mm and a thickness of 2 mm. In addition, the uncrosslinked rubber composition was subjected to transfer molding and molded into a cylindrical shape in molding conditions at 170° C. for 30 minutes. The obtained cylindrical molded article was pressed into a shaft with an outer diameter of 10 mm and was ground to an outer diameter of 15 mm using a cylindrical grinding machine, and was then cut into a rubber width of 20 mm to prepare a paper feed roller. The obtained uncrosslinked rubber composition, crosslinked rubber sheet, and paper feed roller were evaluated as follows.

Testing of Examples

<Appearance of Uncrosslinked Rubber Composition>

Regarding the examples and comparative examples containing a polyether/polyolefin block copolymer resin, whether clumps of a polyether/polyolefin block copolymer resin on the surface and in a cross section of each of the uncrosslinked rubber compositions were present or absent was visually observed and evaluated according to the following criteria.

◯: No clumps of polyether/polyolefin block copolymer resin were observed at all

X: A small amount of clumps of polyether/polyolefin block copolymer resin was observed The following evaluations were performed on examples in which the appearance of the uncrosslinked rubber composition was evaluated as ◯, except for Comparative Example 3.

<Appearance of Crosslinked Rubber Sheet>

Whether clumps of a polyether/polyolefin block copolymer resin on the surface and in a cross section of each of the crosslinked rubber sheets were present or absent was visually observed and evaluated according to the following criteria.

◯: No clumps of polyether/polyolefin block copolymer resin were observed at all

X: A small amount of clumps of polyether/polyolefin block copolymer resin was observed a test piece obtained by laminating three crosslinked rubber sheets with a thickness of 2 mm was used and a measurement time was 3 seconds.

<Coefficient of Friction of Paper Feed Roller>

FIG. 1 is a schematic diagram showing the test. While the other end of measurement paper 4 (pB paper commercially available from Canon Inc.) which had a size of 60 mm×210 mm and had one end that was connected to a load cell 3 was interposed between a prepared paper feed roller 2 and a plate 1 which was horizontally disposed as shown in FIGURE and made of polytetrafluoroethylene (PTFE), a vertical load W of 250 gf was applied to a shaft 5 of the paper feed roller 2 as indicated by a solid line arrow in the drawing. In this state, under an environment of a temperature of 23±2° C. and a relative humidity of 55±10%, the paper feed roller 2 was rotated at a peripheral velocity of 180 mm/s in a direction indicated by a dash-dotted line arrow R, and a conveying force F(gf) applied to the load cell 3 was measured. Then, the measured conveying force F and the vertical load W(=250 gf) were used to obtain a coefficient of friction μ of the roller using Formula (1).

$$\mu = F/W \quad (1)$$

For the coefficient of friction of the paper feed roller, 1.3 or more was a performance target value.

TABLE 1

|  |  | Examples |  |  |  | Comparative Examples |  |  |
|---|---|---|---|---|---|---|---|---|
|  |  | 1 | 2 | 3 | 4 | 1 | 2 | 3 |
| Amount blended in | Non-oil-extended EPDM | 100 | 90 | 100 | 100 | 100 | 90 | 90 |
|  | Oil-extended EPDM | 0 | 20 (10) | 0 | 0 | 0 | 20 (10) | 20 (10) |
|  | Antistatic agent | 7 | 25 | 35 | 40 | 3 | 5 | 25 |
|  | Carbon black | 0.1 | 0.1 | 0.1 | 0.1 | 0.1 | 0.1 | 0.1 |
|  | Zinc oxide | 5 | 5 | 5 | 5 | 5 | 5 | 5 |
|  | Peroxide crosslinking agent | 3 | 1.5 | 3 | 3 | 1.5 | 1.5 | 1.5 |
|  | Sum | 115.1 | 141.6 | 143.1 | 148.1 | 109.6 | 121.6 | 141.6 |
| Mixing temperature (° C.) |  | 140 | 140 | 140 | 140 | 140 | 140 | 80 |
| Evaluation | Appearance of uncrosslinked rubber composition | ◯ | ◯ | ◯ | ◯ | ◯ | ◯ | X |
|  | Appearance of crosslinked rubber sheet | ◯ | ◯ | ◯ | ◯ | ◯ | ◯ | — |
|  | Volume-specific resistivity (Ω·cm) | $3.3 \times 10^{10}$ | $5.9 \times 10^{9}$ | $6.5 \times 10^{8}$ | $5.0 \times 10^{8}$ | $4.7 \times 10^{12}$ | $2.7 \times 10^{11}$ | — |
|  | Hardness of sheet (A) | 44 | 53 | 59 | 61 | 41 | 42 | — |
|  | Coefficient of friction of roller (μ) | 1.6 | 1.5 | 1.4 | 1.4 | 1.6 | 1.6 | — |

<Volume-Specific Resistivity>

The volume-specific resistivity of each of the crosslinked rubber sheets was measured according to JIS K 6271 under an atmosphere of 23° C. and a humidity of 55% at a voltage of 1 kV. A lower value of the volume-specific resistivity indicates a better antistatic ability. Here, a volume-specific resistivity of less than $1.0 \times 10^{11}$ Ω·cm was a performance target value.

<Measurement of Hardness of Rubber Sheet>

The hardness of each of the crosslinked rubber sheets was measured using a type A durometer according to JIS K 6253 under an atmosphere of 23° C. and a humidity of 55%. Here, In Comparative Example 3 in which mixing was performed at 80° C. which was below the melting point of Pelectron HS, since clumps of the antistatic agent remained in the uncrosslinked rubber composition, and poor dispersion was apparent, evaluation using a crosslinked rubber sheet was not performed. The surface and cross section of the crosslinked rubber sheets of Examples 1 to 4 and Comparative Examples 1 and 2 were uniformly finished and the antistatic agent was favorably dispersed. In all of these formulations, a coefficient of friction in the form of a roller was evaluated as 1.4 or more, which allowed a paper feed roller to be useable.

The volume-specific resistivity of the rubber sheets of Examples 1 to 4 was less than $1.0\times10^{11}$ Ω·cm, which is a volume-specific resistivity at which a rubber composition can be used for antistatic purposes. On the other hand, Comparative Examples 1 and 2, in which less than 5 parts by weight of the antistatic agent was included, had a volume-specific resistivity of the rubber sheets that was $1.0\times10^{11}$ Ω·cm or more and were a so-called insulating rubber composition.

The antistatic agent is uniformly dispersed in the rubber composition of the present disclosure, and the rubber composition has an excellent antistatic ability, coefficient of friction, and wear resistance. Therefore, the rubber composition is appropriate for use in a paper feed roller of an inkjet printer and the like.

That is, the present disclosure is as follows.

[1] The rubber composition includes 7 parts by mass or more of a polyether/polyolefin block copolymer resin with respect to 100 parts by mass of a rubber component, and the total amount or a part of a rubber component is mixed with a polyether/polyolefin block copolymer resin at a temperature that is equal to or higher than a melting point of the polyether/polyolefin block copolymer resin.

[2] The rubber composition according to [1], wherein a proportion of EPDM in the total amount of the rubber component is 96 mass % or more.

[3] A paper feed roller obtained by crosslinking the rubber composition according to [1] or [2].

[4] The paper feed roller according to [3], wherein the paper feed roller is used for an inkjet printer.

Since an antistatic agent is uniformly dispersed in the rubber composition of the present disclosure and the rubber composition has an excellent antistatic ability, coefficient of friction, and wear resistance, it is appropriate for use in a paper feed roller of an inkjet printer and the like.

What is claimed is:

1. A paper feed roller obtained by crosslinking a rubber composition, the rubber composition comprising:

7 parts by mass or more and 40 parts by mass or less of a polyether/polyolefin block copolymer resin with respect to 100 parts by mass of a rubber component; and 1.5 parts by mass or more and 3.5 parts by mass or less of a peroxide crosslinking agent with respect to 100 parts by mass of the rubber component, wherein the total amount or a part of a rubber component is mixed with a polyether/polyolefin block copolymer resin at a temperature that is equal to or higher than a melting point of the polyether/polyolefin block copolymer resin, and a proportion of EPDM in the total amount of the rubber component is 96 mass % or more.

2. The paper feed roller according to claim 1, wherein the paper feed roller is used for an inkjet printer.

3. The paper feed roller according to claim 1, wherein the rubber composition comprises 0.05 parts by mass or more and 1.5 parts by mass or less of a carbon black with respect to 100 parts by mass of the rubber component.

4. The paper feed roller according to claim 1, wherein the rubber composition comprises 4 parts by mass or more and 9 parts by mass or less of zinc oxide with respect to 100 parts by mass of the rubber component.

5. The paper feed roller according to claim 1, wherein a coefficient of friction μ of roller is 1.3 or more.

* * * * *